US009696091B2

(12) United States Patent
Hauber (10) Patent No.: US 9,696,091 B2
(45) Date of Patent: Jul. 4, 2017

(54) SUPERIMPOSED ZONES PROCESS HEATING

(71) Applicant: ADC Acquisition Company, Schenectady, NY (US)

(72) Inventor: David E. Hauber, Troy, NY (US)

(73) Assignee: ADC Acquisition Company, Schenectady, NY (US)

( * ) Notice: Subject to any disclaimer, the term of this patent is extended or adjusted under 35 U.S.C. 154(b) by 856 days.

(21) Appl. No.: 13/939,544

(22) Filed: Jul. 11, 2013

(65) Prior Publication Data
US 2014/0017620 A1 Jan. 16, 2014

Related U.S. Application Data

(60) Provisional application No. 61/671,370, filed on Jul. 13, 2012.

(51) Int. Cl.
| | |
|---|---|
| *F27D 11/00* | (2006.01) |
| *F27D 99/00* | (2010.01) |
| *B23B 31/20* | (2006.01) |
| *H01M 2/18* | (2006.01) |
| *F27B 9/06* | (2006.01) |
| *H05B 1/00* | (2006.01) |
| *H05B 3/68* | (2006.01) |
| *F27D 11/12* | (2006.01) |
| *B29C 70/38* | (2006.01) |
| *B29C 35/08* | (2006.01) |
| *B29C 35/04* | (2006.01) |

(52) U.S. Cl.
CPC .......... *F27D 11/00* (2013.01); *B29C 35/0805* (2013.01); *B29C 70/38* (2013.01); *F27D 11/12* (2013.01); *F27D 99/0006* (2013.01); *B29C 35/045* (2013.01); *B29C 2035/0811* (2013.01); *B29C 2035/0822* (2013.01); *B29C 2035/0827* (2013.01); *B29C 2035/0838* (2013.01); *B29C 2035/0855* (2013.01); *F27D 2099/0028* (2013.01)

(58) Field of Classification Search
None
See application file for complete search history.

(56) References Cited

U.S. PATENT DOCUMENTS

| | | | | |
|---|---|---|---|---|
| 4,100,009 | A * | 7/1978 | Nakajima | B01D 17/045 156/184 |
| 4,197,156 | A * | 4/1980 | Nakajima | B01D 17/045 156/184 |
| 4,492,041 | A * | 1/1985 | Mansour | F26B 21/00 34/242 |
| 4,621,929 | A * | 11/1986 | Phillips | A61B 5/028 356/44 |
| 5,181,330 | A * | 1/1993 | Schoch | B31F 1/285 156/272.2 |
| 5,270,519 | A | 12/1993 | Higgins | |
| 5,440,101 | A | 8/1995 | Cox et al. | |
| 5,626,471 | A * | 5/1997 | Howie | F23D 14/52 431/251 |

(Continued)

*Primary Examiner* — Gregory Huson
*Assistant Examiner* — Eric Gorman
(74) *Attorney, Agent, or Firm* — Maxine L. Barasch; Keohane & D'Alessandro PLLC (57) ABSTRACT

Embodiments of the present invention include a heating method and apparatus in which a plurality of heated regions is superimposed in order to improve energy density control.

12 Claims, 7 Drawing Sheets

(56) References Cited

U.S. PATENT DOCUMENTS

| | | | | |
|---|---|---|---|---|
| 5,886,313 | A * | 3/1999 | Krause | B23K 26/034 |
| | | | | 219/121.6 |
| 6,541,152 | B1 | 4/2003 | Shoji et al. | |
| 6,799,619 | B2 | 10/2004 | Holmes et al. | |
| 7,576,850 | B2 * | 8/2009 | Engelbart | B29C 70/38 |
| | | | | 356/237.2 |
| 8,050,486 | B2 * | 11/2011 | Walton | B29C 70/32 |
| | | | | 356/237.3 |
| 2003/0019931 | A1 * | 1/2003 | Tsikos | G02B 26/10 |
| | | | | 235/454 |
| 2003/0042303 | A1 * | 3/2003 | Tsikos | G06K 7/10594 |
| | | | | 235/384 |
| 2007/0280501 | A1 * | 12/2007 | Walton | G01N 21/8806 |
| | | | | 382/100 |
| 2016/0067913 | A1 * | 3/2016 | Draht | B23K 11/0053 |
| | | | | 156/73.5 |
| 2016/0207259 | A1 * | 7/2016 | Fruth | B22F 3/1055 |

\* cited by examiner

SUPERIMPOSED ZONES PROCESS HEATING

CROSS-REFERENCE TO RELATED APPLICATION

The present patent document claims priority to U.S. Provisional Patent Application Ser. No. 61/671,370, filed Jul. 13, 2012, entitled "SUPERIMPOSED ZONES PROCESS HEATING", the disclosure of which is incorporated herein by reference.

FIELD OF THE INVENTION

The present invention relates generally to heating of materials, and more particularly, to a method and apparatus for superimposed zones process heating.

BACKGROUND

Uniformly heating complex surfaces is a common problem in industry. Applying a uniform energy field to a complex surface results in non-uniform heating. An attempted solution is to divide the area into small independently controlled zones but this increases complexity and expense. What is needed is some means to improve surface heating energy distribution with reduced expense and complexity.

SUMMARY OF THE INVENTION

Embodiments of the present invention perform heating of a material using a plurality of superimposed zones. The superimposed zones address the problem of difficult alignment of heating zones as experienced in prior art systems.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION

Figure 1:
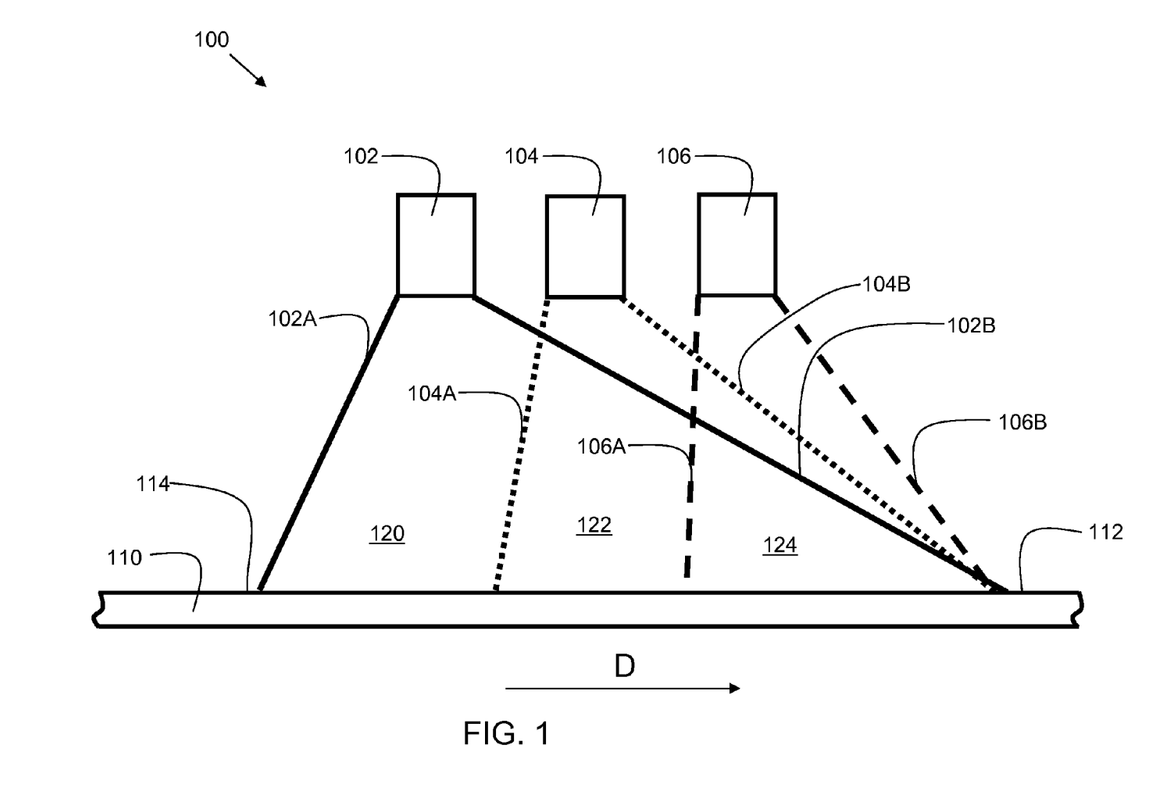
FIG. 1 shows an element of a heating system in accordance with an embodiment of the present invention.

FIG. 1 shows an element of a heating system 100 in accordance with an embodiment of the present invention. Heating system 100 is comprised of a plurality of heating elements (102, 104, and 106). Embodiments of the present invention may have two or more heating elements. Some embodiments may have several heating elements. The heating elements may include, but are not limited to, lasers, induction, gas jets, infrared heat sources, microwave heat sources, and ultraviolet heat sources. In some embodiments, all of the heating sources may be of the same variety (e.g. all lasers). In other embodiments, multiple types of heat sources may be used. For example, one heat source may be an infrared heat source while other heat sources may be lasers.

In the case where the heat sources are all lasers, each laser may have different beam optics such that each beam is focused and aimed differently. As shown in FIG. 1, the three heat sources have three different energy windows (the area where the energy "heat" is applied to the material 110). The material 110 may be a relatively flat strip of material such as a composite fiber tape, which may be a thermoset tape, prepreg tape, or other composite material. The energy window for heat source 102 is defined by the area of material 110 in between lines 102A and 102B. Similarly, the energy window for heat source 104 is defined by the area of material 110 in between lines 104A and 104B, and the energy window for heat source 106 is defined by the area of material 110 in between lines 106A and 106B. This arrangement results in three heat zones 120, 122, and 124. The energy window for heat source 102 is referred to as the main energy window, as it is the largest. The main energy window completely superimposes the secondary energy windows (from heat sources 104 and 106). This avoids unpredictable gaps and spikes in heat energy applied to the material.

Heat zone 120 receives energy only from heat source 102. Heating zone 122 receives energy from heat source 102 and heat source 104. Heating zone 124 receives energy from all three heat sources (102, 104, and 106). The material 110 is traveling through the heat zones in the direction indicated by the arrow D. A tape dispensing mechanism may be used to transport the material through the heat zones. Point 114 represents the entry point, where the material is about to enter the heat zones. Point 112 represents the exit point, where the material has just left the heat zones. With this configuration, the maximum temperature is reached at the exit point 112. In an alternative embodiment, the direction D may be reversed, which is useful in cases where uniform heating over the entire area of the heat zones is preferred. In some embodiments, the material is heated to a temperature in the range of about 100 degrees Celsius to about 200 degrees Celsius. In other embodiments the material could be heated to much higher temperatures, such as in the range of about 500 degrees Celsius to about 550 degrees Celsius for thermo plastics, and in the range of about 1300 degrees Celsius to about 1550 degrees Celsius for steel, for example.

Figure 1B:
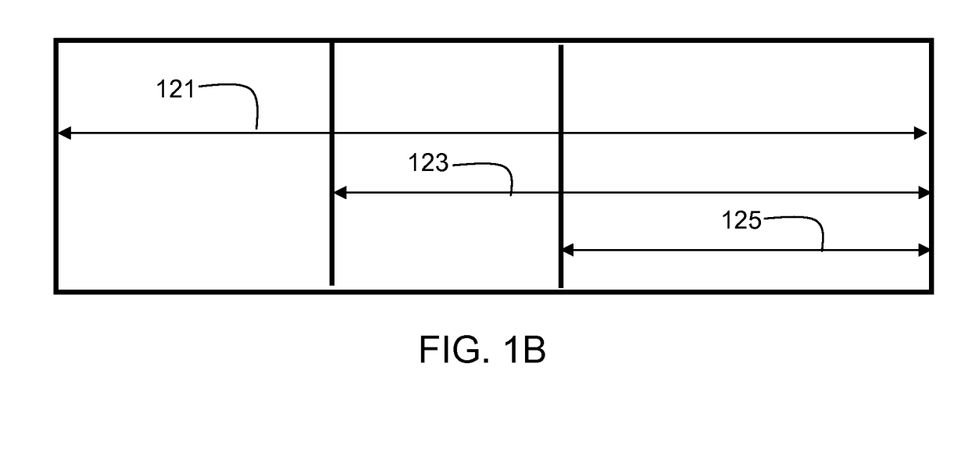
FIG. 1B shows completely superimposed energy windows.

FIG. 1B shows completely superimposed energy windows. Energy window 121 is the large energy window which spans the entire heating area (indicated by arrow 121). Energy window 123 (indicated by arrow 123) is completely superimposed by large energy window 121. That is, no part of energy window 123 is outside of energy window 121. Similarly, energy window 125 (indicated by arrow 125) is completely superimposed by both energy window 123 and energy window 121, as no part of energy window 125 is outside of either of the other windows.

Figure 2:
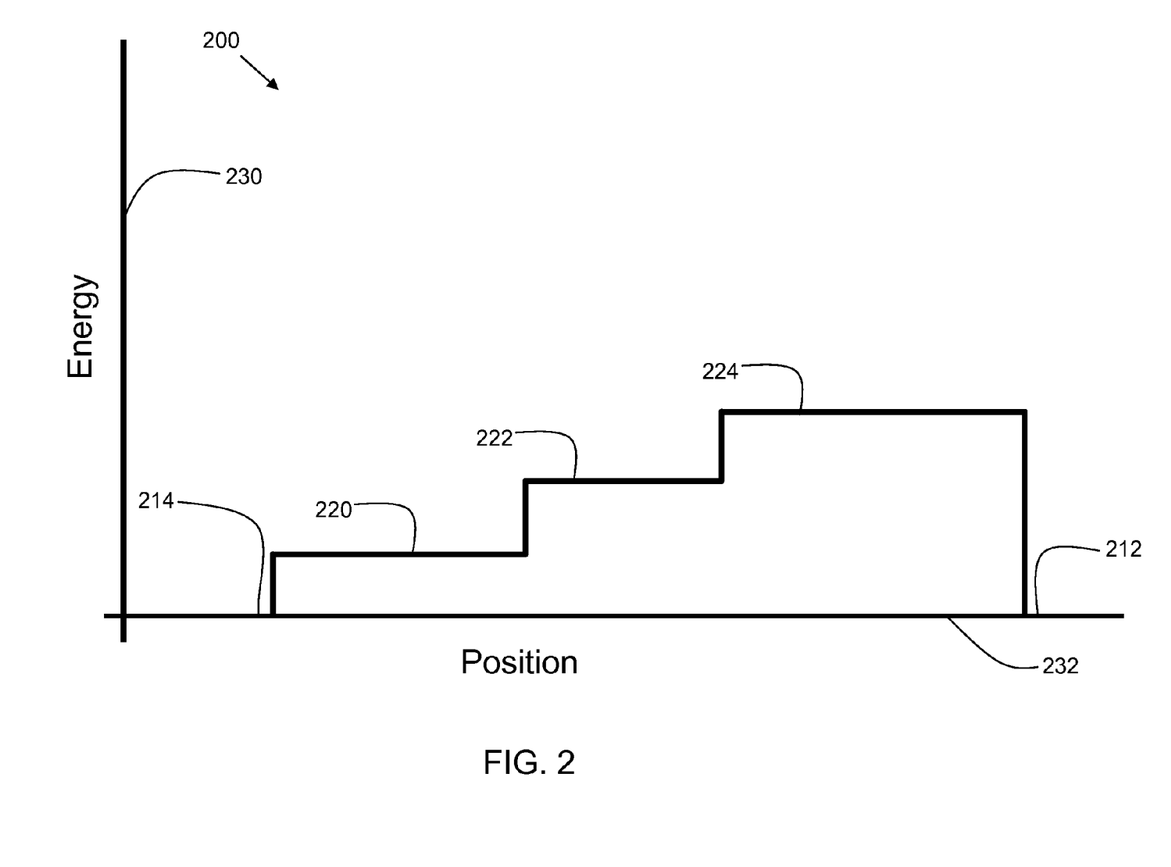
FIG. 2 is a graph of an energy density profile such as generated by the embodiment of FIG. 1.

FIG. 2 is a graph 200 of an energy profile such as generated by the embodiment of FIG. 1. The vertical axis 230 represents the amount of energy (heat) applied to a material, such as a thermoset composite tape. The horizontal axis 232 represents the position within the heating zones. Portion 220 of the plot corresponds to heat zone 120. Portion 222 corresponds to heat zone 122. Portion 224 corresponds to heat zone 124.

Point 214 represents the entry point, where the material is about to enter the heating zones. Point 212 represents the exit point, where the material has just left the heating zones.

The speed at which the material is being fed through the heating zones is a factor in determining the temperature of the material at exit point 212.

Embodiments of the present invention may monitor the temperature of the material at exit point 212 or multiple points within the heated zone, and the material delivery speed, and adjust the intensity of one or more of the heat sources 102, 104 and 106, to maintain a desired temperature of the material at the exit point.

Figure 3:
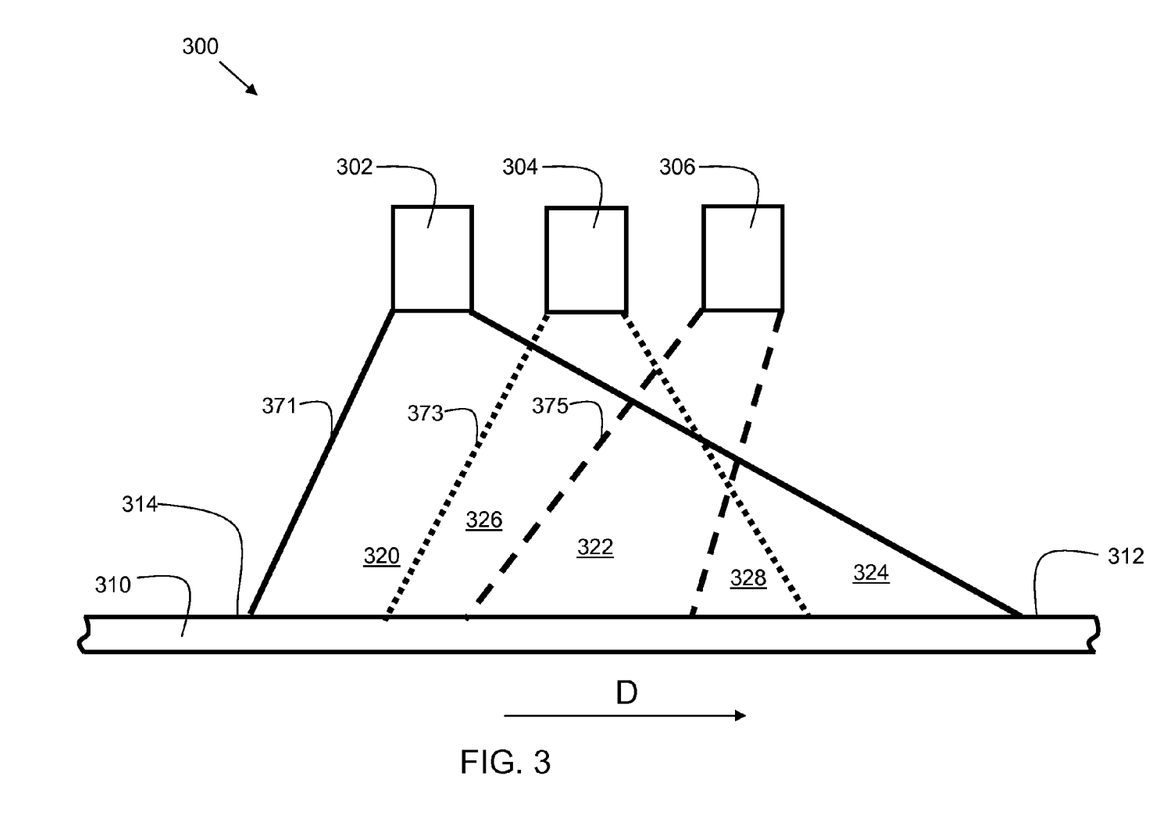
FIG. 3 shows an element of a heating system in accordance with an embodiment of the present invention.

FIG. 3 shows an element of a heating system 300 in accordance with an alternative embodiment of the present invention. In this embodiment, the energy windows 371, 373, and 375 of the heat sources 302, 304 and 306, respectively, are arranged to create additional heating zones. With this arrangement, the three heat sources are arranged in a nested manner, where energy window 375 is completely within energy window 373, which is completely within energy window 371. The nested arrangement forms five heat zones (320, 326, 322, 328, and 324). Heat zones 320 and 324 receive energy from heat source 302. Heat zones 326 and 328 receive energy from heat source 302 and heat source 304. Heat zone 322 receives energy from all three heat sources (302, 304, and 306). Point 314 represents the entry point, where the material is about to enter the heat zones. Point 312 represents the exit point, where the material 310 has just left the heat zones.

Figure 4:
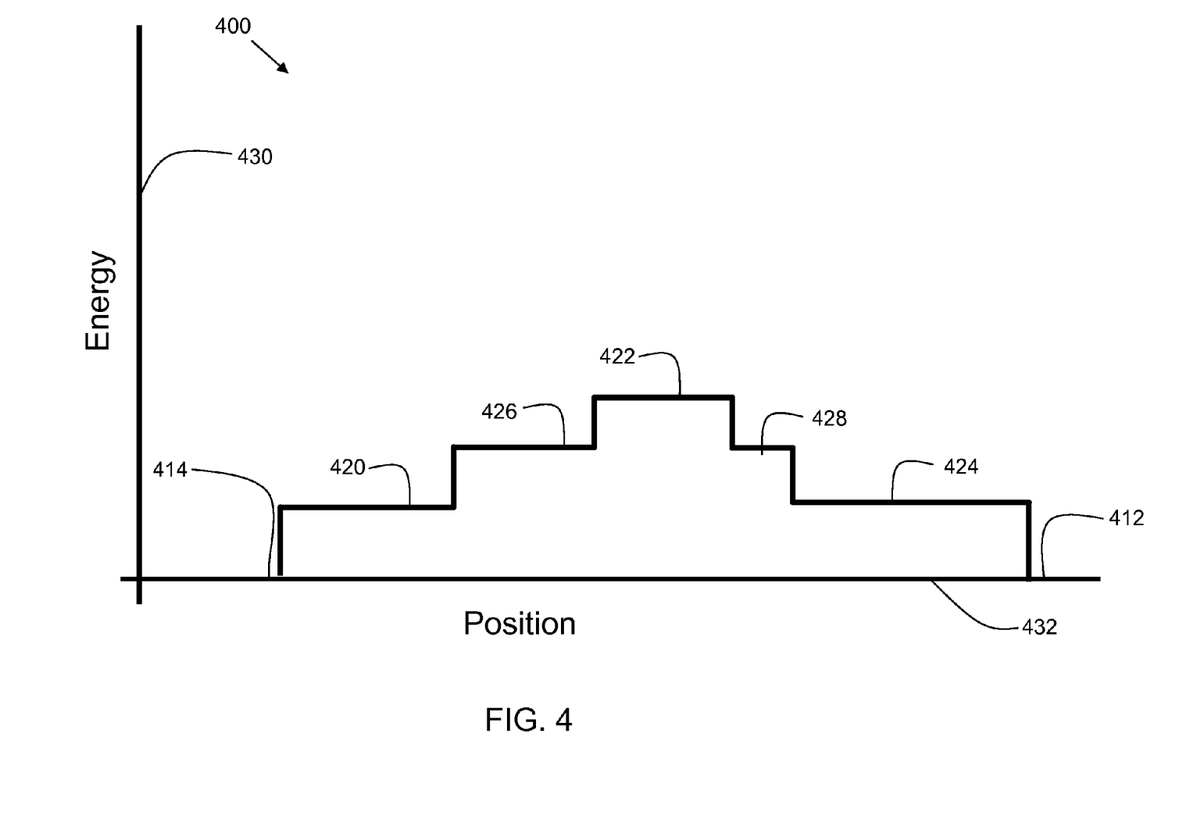
FIG. 4 is a graph of an energy density profile such as generated by the embodiment of FIG. 3.

FIG. 4 is a graph 400 of an energy profile such as generated by the embodiment of FIG. 3. The vertical axis 430 represents the amount of energy (heat) applied to a material, such as a thermoset composite tape. The horizontal axis 432 represents the position within the heating zones. Portion 420 of the plot corresponds to heating zone 320 (FIG. 3). Portion 422 corresponds to heating zone 322. Portion 424 corresponds to heating zone 324. Portion 426 corresponds to heating zone 326. Portion 428 of the plot corresponds to heating zone 328.

Point 414 represents the entry point, where the material is about to enter the heating zones. Point 412 represents the exit point, where the material has just left the heating zones. The speed at which the material is being fed through the heating zones is a factor in determining the temperature of the material at exit point 412.

Figure 5:
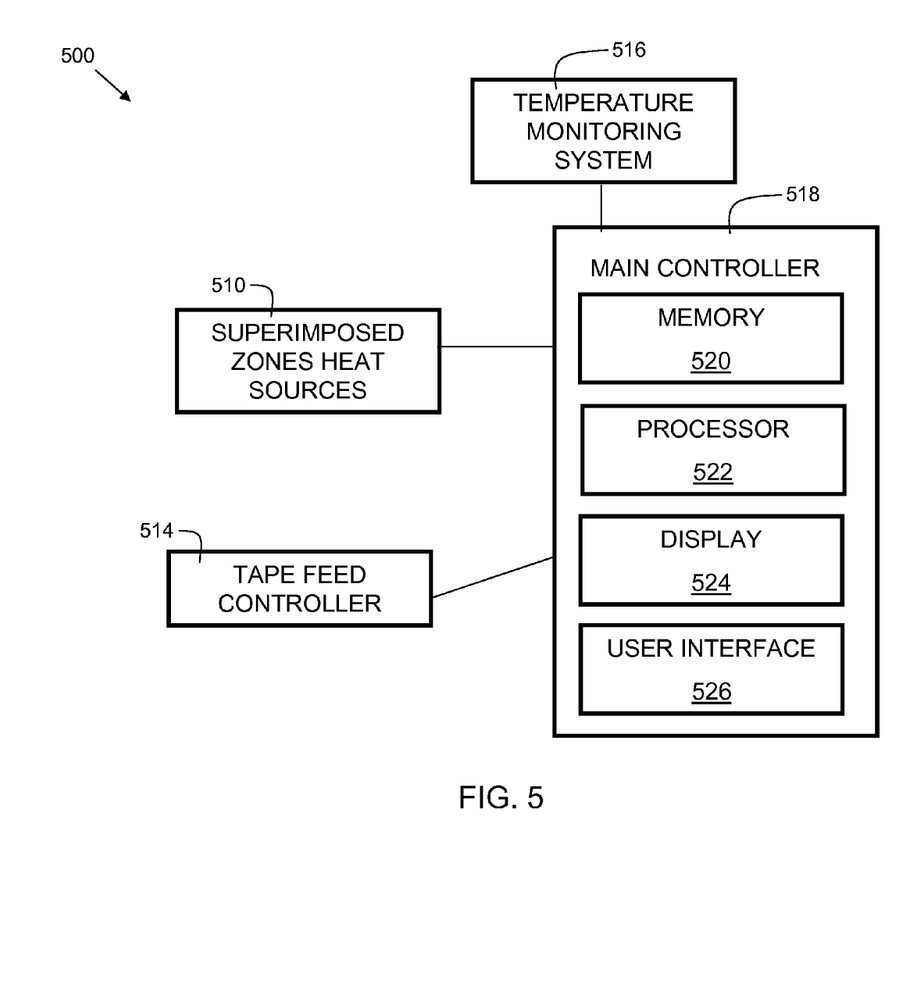
FIG. 5 shows a system block diagram in accordance with an embodiment of the present invention.

FIG. 5 shows a system block diagram 500 in accordance with an embodiment of the present invention. System 500 comprises a main controller 518. Main controller 518 may be a computer comprising memory 520, and a processor 522 which is configured to read and write memory 520. The memory 520 may be non-transitory memory, such as flash, ROM, non-volatile static ram, or the like. The memory 520 contains instructions that, when executed by processor 522, control the various subsystems to operate system 500. Main controller 518 may also comprise a display 524 and a user interface 526 for interacting with the system 500. The user interface 526 may comprise a keyboard, touch screen, mouse, or the like.

The main controller 518 may receive temperature information from temperature monitoring system 516. Temperature monitoring system 516 may comprise a non-contact device for measuring the temperature of the material near the exit point (e.g. 112 of FIG. 1). The temperature monitoring system 516 may comprise a thermal imaging system or other suitable means for monitoring the temperature of the material near the exit point. The main controller may in turn adjust the energy output of one or more of the heat sources 510 (e.g. 102, 104, and 106 of FIG. 1) to maintain a desired temperature range. The material dispensing speed, which determines the amount of time the material remains within the heat zones, may also be monitored by the main controller 518 by communicating with tape feed controller 514. If the dispensing speed increases, the energy output may also be increased to compensate for the reduced time the material spends in the heat zones. If the speed increases beyond the point where the temperature can be maintained at the desired temperature, the main controller 518 can communicate with the tape feed controller 514 to reduce the speed. Similarly, if the speed is reduced, which increases the time the material spends in the heat zones, then the energy output of one or more of the heat sources may be reduced. If uniform heating along the length of the heat zones is desired, then the first heater could be set to a preheat energy (high heat) and output more energy in order to rapidly increase the surface temperature, and subsequent sources could be set to a maintenance energy (medium heat) to provide less energy to maintain the surface temperature at some set point. In some embodiments, the preheat energy is two to three times greater than the maintenance energy. The actual temperature ranges used depend on the type of composite material being used. Alternatively, if the desired temperature at the exit of the heat zone is specified, then the opposite scenario might be used. That is, the first heat sources could be used to preheat the strip of material and the final source could be used to fine tune the temperature just before it exits the heated area. This could be facilitated by reversing the direction D shown in FIG. 3.

The memory 520 of the main controller 518 may be configured to store a plurality of material profiles. Each material profile may contain the various parameters for optimal heating, such as a desired energy density profile for that material. For example, some materials may perform better when heated gradually, whereas for other materials, a specific exit temperature range may be more important. The profile for each material may contain the preferred energy output settings for each heat source, and may also contain a preferred material dispensing speed. When a user is using a particular material, he may select the corresponding material profile, which then establishes the desired settings of the heat sources 510 and optionally the dispensing speed by communicating with tape feed controller 514.

Figure 6:
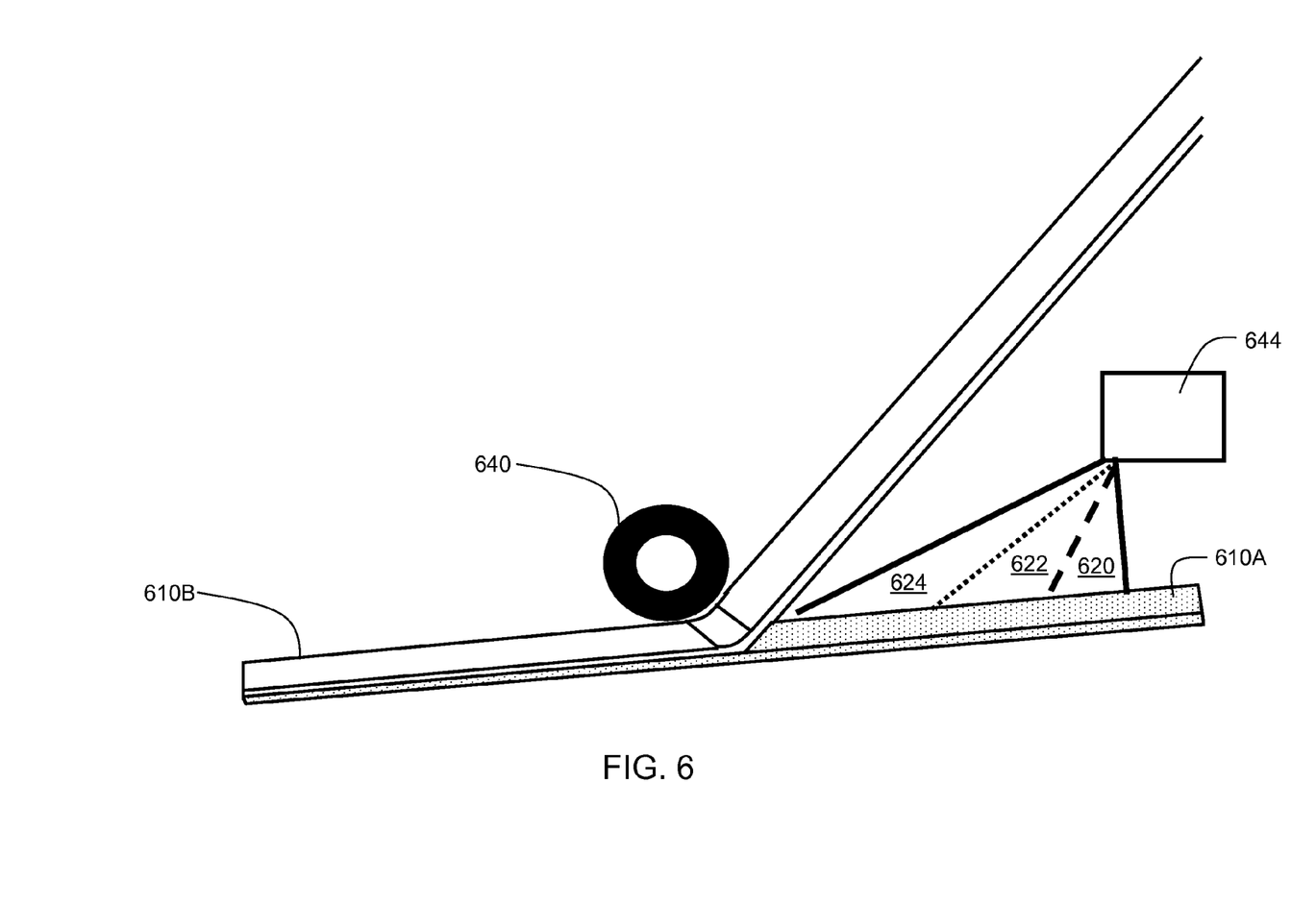
FIG. 6 shows details of an embodiment of the present invention as used in a fiber placement apparatus.

FIG. 6 shows details of an embodiment of the present invention as used in a fiber placement apparatus. As shown in FIG. 6, a currently dispensed ply of tape 610B is being applied over a previously dispensed ply 610A. A superimposed zones heat source 644, comprised of a plurality of independent heat sources is configured to create multiple heat zones 620, 622, and 624. Shortly after exiting the heat zones, the currently dispensed tape ply 610B is compacted with compaction roller 640. In other embodiments, a fluid compaction source may be used instead of a physical compaction source.

As can now be appreciated, embodiments of the present invention provide a method and apparatus for superimposed zones process heating. Embodiments of the present invention may have two or more heat sources, wherein the heat sources are configured to create superimposed zones. The plurality of heat sources may comprise all one type (e.g. all lasers), or may be a mix of different types. For example, a large zone may be accomplished with an infrared heat source, while smaller, superimposed zones may be accomplished via a laser source. For lasers, each individual laser may have uniquely configured optics and beam steering to achieve the desired energy density profile. A feedback system may be used to monitor the material temperature, and optionally the material dispensing speed. The energy output of the heat sources may be adjusted in response to the monitored temperature and/or material dispensing speed to achieve a desired exit temperature range.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An apparatus for heating a thermoset composite tape material comprising:
    a processor;
    a tape feed controller;
    a compaction roller for compacting the thermoset composite tape material;
    a first heat source;
    a second heat source;
    wherein the first heat source is configured and disposed to form a first energy window on a first ply of the thermoset composite tape material, and wherein the second heat source is configured and disposed to form a second energy window on the first ply of the thermoset composite tape material, wherein the first energy window is completely superimposed on the second energy window; and
    further comprising a third heat source, wherein the third heat source is configured and disposed to form a third energy window on the first ply of the thermoset composite tape material, wherein the second energy window is completely superimposed on the third energy window, and wherein the processor is configured and disposed to control the tape feed controller such that the heated first ply of the thermoset composite tape material and a second ply of the thermoset composite tape material are compacted by the compaction roller after exiting the third energy window.

2. The apparatus of claim 1, wherein the first heat source and the second heat source comprise lasers.

3. The apparatus of claim 1, wherein the first heat source and the second heat source comprise microwave heat sources.

4. The apparatus of claim 1, wherein the first heat source and the second heat source comprise ultraviolet heat sources.

5. The apparatus of claim 1, wherein the first heat source and the second heat source comprise infrared heat sources.

6. The apparatus of claim 1, wherein the first heat source, the second heat source, and the third heat source, are arranged to form nested energy windows such that the first heat source covers a larger area than the second heat source, and the second heat source covers a larger area than the third heat source.

7. The apparatus of claim 6, wherein the first energy window is larger than the second energy window, and wherein the second energy window is larger than the third energy window, and wherein the first heat source is an infrared heat source, and wherein the second heat source is a laser, and wherein the third heat source is a laser.

8. The apparatus of claim 6, wherein the first heat source, the second heat source, and the third heat source, are arranged to form five heat zones.

9. The apparatus of claim 8, further comprising a tape feed controller, configured and disposed to dispense a composite tape into the five heat zones.

10. The apparatus of claim 1, wherein the first heat source, the second heat source, and the third heat source comprise microwave heat sources.

11. The apparatus of claim 1, wherein the first heat source, the second heat source, and the third heat source comprise ultraviolet heat sources.

12. The apparatus of claim 1, wherein the first heat source, the second heat source, and the third heat source comprise infrared heat sources.

* * * * *

UNITED STATES PATENT AND TRADEMARK OFFICE
CERTIFICATE OF CORRECTION

Page 1 of 1

PATENT NO. : 9,696,091 B2
APPLICATION NO. : 13/939544
DATED : July 4, 2017
INVENTOR(S) : David E. Hauber It is certified that error appears in the above-identified patent and that said Letters Patent is hereby corrected as shown below:

In the Specification

Column 2, Line 15, after "102A and", Delete "1028" and Insert -- 102B --; and

Column 2, Line 17, after "104A and", Delete "1048" and Insert -- 104B --.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*